Dec. 31, 1968

R. R. EBY 3,419,301

TWINE CLAMP MEANS FOR KNOTTER OF BALER

Filed Aug. 16, 1967

INVENTOR.
RICHARD R. EBY
BY
ATTORNEY

| United States Patent Office | 3,419,301
Patented Dec. 31, 1968 |
|---|---|

3,419,301
TWINE CLAMP MEANS FOR KNOTTER OF BALER
Richard R. Eby, Ephrata, Pa., assignor to Sperry Rand Corporation, New Holland, Pa., a corporation of Delaware
Filed Aug. 16, 1967, Ser. No. 660,969
7 Claims. (Cl. 289—13)

ABSTRACT OF THE DISCLOSURE

A knotter having relatively stationary and movable clamping members in which the stationary member is provided with an axial bore in which a shaft rotates to support the movable clamping member, said stationary member having a discharge opening extending substantially radially outward from said bore to provide an escape for twine particles migrating from between said members and one side of said notch being sharpened to form a cutting edge to facilitate discharge of such particles from said clamping members.

BACKGROUND OF THE INVENTION

Balers employing twine to tie the bales into completed condition include a knotter unit for each strand of twine which automatically ties ends of each strand into a tight knot. Incident to such tying of each strand, the leading end of a strand of twine is secured in operative position relative to each knotter unit by clamping means usually arranged adjacent the upper surface of the bale as it is formed. The strand of twine also extends through an eye in the outer end of an arcuate needle which ultimately produces a strand of twine that encircles the bale, while the bale is compressed.

The knotter unit operates at this stage of the procedure to tie the aforementioned leading end of a strand of twine to another portion of said strand which becomes the opposite end of each encircling strand of twine around the bale. Incident to forming the knot which ties said ends of each strand of twine together, the aforementioned leading end of the strand of twine is released from the clamping means but, upon severing the completed strand from the remaining supply of twine, the newly severed end of said supply becomes the leading end of the next strand and it is essential that said leading end subsequently be clamped securely while the next bale is being formed, whereby the aforementioned procedure is repeated with the formation of each bale.

In order that the clamping means associated with each knotter unit referred to above may function properly, such clamping means comprises two relatively movable clamping members. One of these is mounted stationarily with respect to the knotter unit, while the other is movable both rotatably and axially by means of a shaft which extends through a bore positioned axially within the stationary clamping member. Rotation of the movable clamping member with respect to the stationary one is necessary in view of a hook which is fixed to the movable clamping member and must be revolved by means of said shaft in order to permit the knotter unit to function properly to form the knot by which the ends of each encircling strand of twine are secured together.

Operation of the movable clamping member with respect to the stationary member has heretofore resulted in particles and shreds of the fibers of which the twine is composed becoming twisted around the shaft which supports the movable clamping member and also becoming lodged within the bore within which said shaft rotates, thereby producing undesired and unnecessary friction as well as ultimate malfunctioning of the clamping members. Correction of such condition in existing balers not infrequently requires the periodic disassembly of at least portions of the clamping and knotting mechanism in order to relieve the shaft and bore of the accumulated particles and shreds of twine fibers in order to restore the knotter to its normal intended operating function. The difficulties encountered in presently used knotters of balers can be appreciated from the prior U.S. Patent Nos. 615,-815 to S. K. Dennis and 512,762 to B. F. Stewart which, while relatively old, generally represent the art as it presently exists.

SUMMARY OF THE INVENTION

It now has been found that the aforementioned difficulty existing with respect to the clamping means associated with knotter units in balers of the type described above may be overcome very effectively by relatively simple means comprising the formation of a discharge opening which preferably extends radially outward from the bore within the stationary clamping member, said opening being of sufficient area and shape that ready escape of any particles or shreds of twine fibers which move between the rotating shaft of the movable clamping member and the bore within the stationary clamping member may automatically be discharged with ease from the clamping means through said discharge opening.

In the preferred construction of such opening, the stationary clamping member is provided with a boss-like portion within which said bore is formed that movably receives the shaft of the movable clamping member. Also, the clamping members preferably are provided with complementary, conical clamping surfaces and the end of the stationary clamping member opposite such clamping surface therein abuts supporting means. It has been found that forming such discharge opening in said stationary clamping member so as to extend substantially axially of said member a limited distance inward from the end thereof which engages the supporting means is highly satisfactory.

It has further been found that it is preferable to form the discharge opening so as to subtend a portion of the circumferential surface of the bore in the stationary member for a minor portion of the circumference thereof and, further, to additionally facilitate the discharge of unwanted particles and shreds of twine fibers through said discharge opening, it has been found desirable to dispose the walls defining the sides of said opening so as to flare outwardly with respect to each other.

An additional advantage also is obtained in regard to such discharge opening if the leading side of said discharge opening, considered in the direction of rotation of the shaft in the bore of said stationary clamping member, is disposed at an acute angle with respect to the adjacent bore surface so as to define what substantially amounts to a knife edge which is normally disposed in operation substantially in sliding contact by the shaft which is rotatable and otherwise movable within the bore of the stationary clamping member, thus scraping or shaving any accumulated particles or shreds of twine fiber from the rotating shaft and thereby facilitate the exiting of the same through said discharge opening.

DESCRIPTION OF THE PREFERRED EMBODIMENT

Figure 1:
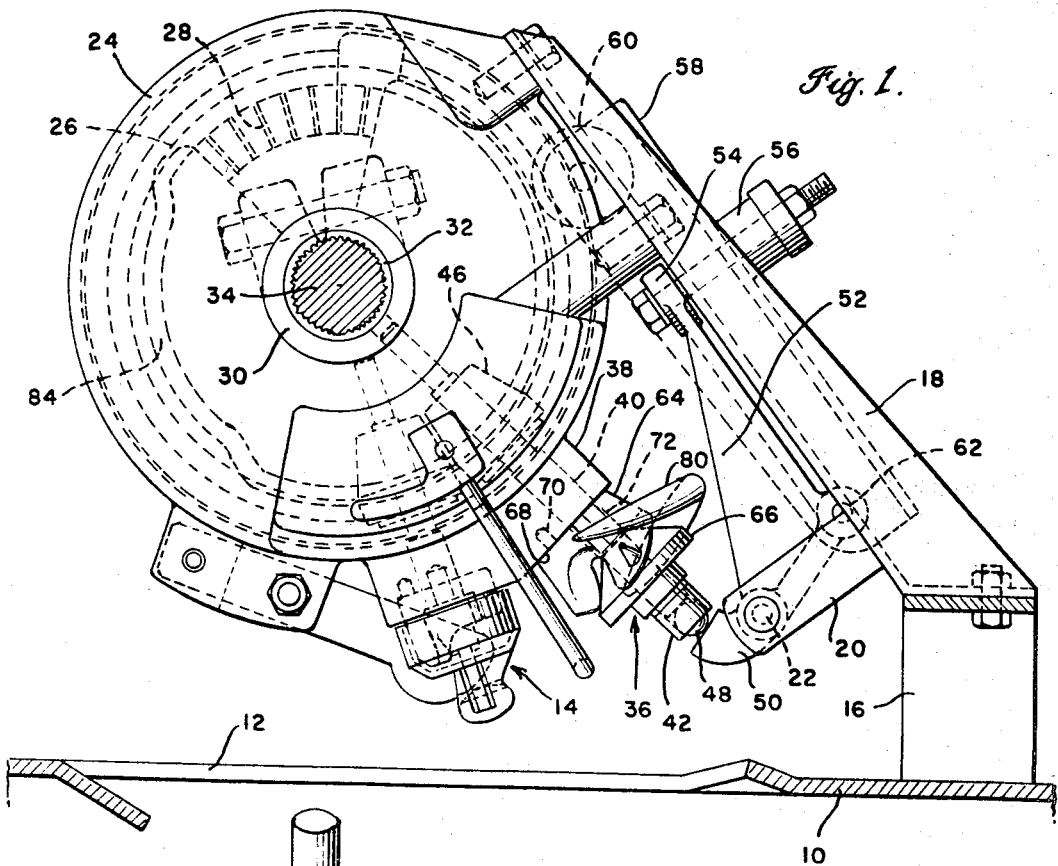
FIG. 1 is an end view of a knotter unit of a baler with which twine clamp means embodying the principles of the present invention are associated, the same being supported by a fragmentarily illustrated and vertically sectioned portion of the casing or housing of a baler.

Referring to FIG. 1, a fragmentarily illustrated portion of the top wall 10 of a baler is shown in which a slot 12 is provided through which an arcuate needle, not illustrated, of conventional nature in balers of the type of which the present invention pertains is projected for purposes of facilitating the operation of the knotter unit 14. To simplify the illustration of the present invention, it is not believed necessary to describe all of the various elements and function of the knotter unit 14 inasmuch as the same essentially comprises the subject matter of Edwin B Nolt's commonly owned copending patent application, Ser. No. 633,496, filed Apr. 25, 1967 and in which the details and operations thereof are fully set forth. Accordingly, for a complete understanding of the same, attention is directed to said copending application.

Affixed to the top wall 10 is a bracket 16 to which one end of a rigid arm 18 is secured by bolts or otherwise so as to extend angularly with respect to the surface of top wall 10. Projecting laterally from the lower portion of arm 18 are a pair of similar, parallel but transversely spaced projections 20 through the outer end of which a pivot pin 22 extends for purposes to be described. Fixed to the outermost portion of rigid arm 18 is a casting 24 which is in the form of a housing that encloses a rotatable cam 26 and a segmental gear section 28 fixed thereto for rotation therewith.

Casting 24 is provided with bearing means 30 which rotatably receives an internally splined bearing sleeve 32 which is longitudinally slidable upon and rotatable with a one-revolution timer shaft 34 having an exterior surface complementary to the internally splined surface of bearing sleeve 32. Shaft 34 is supported at its axial ends on wall 10 by means not shown and it is rotated by means otherwise provided in the baler and not illustrated herein. It nevertheless should be sufficient to explain that cam 26 and its associated segmental gear section 28 are rotated by shaft 34 for purposes of bringing the segmental gear section 28 into driving engagement with the knotter unit 14 and also for operating the clamp means 36 comprising the principal subject matter of the present invention.

Figure 2:
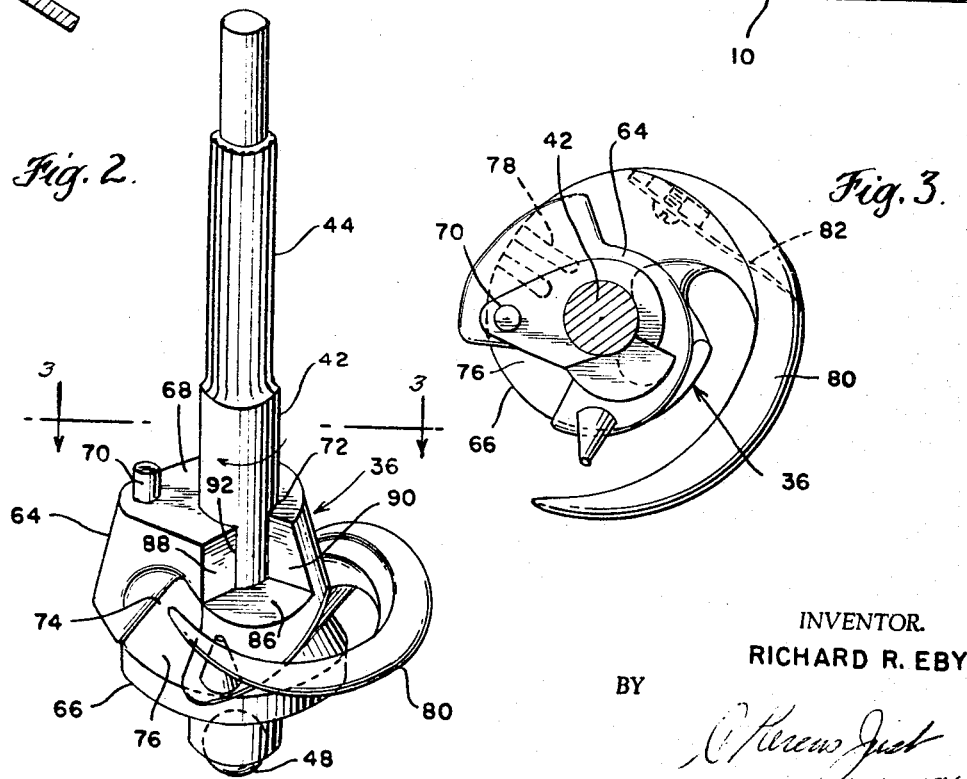
FIG. 2 is a perspective view of associated clamping members illustrated on a larger scale than employed in FIG. 1 and showing to a greater extent than in FIG. 1 details of such clamping members, in one of which the discharge opening comprising the present invention is formed.

Casting or housing 24 is provided with an integral projection or boss 38 which etxends radially outward from the periphery of casting 24 and the same is provided with a radial bore 40 comprising bearing means to receive, for both rotatable and longitudinal movement, a shaft 42 which is best illustrated in FIG. 2. Intermediately of the ends of said shaft 42, parallel splines 44 are arranged around the entire exterior surface of an axial portion 43 for engagement with a complementary interior surface on a bevel gear 46 shown in FIG. 1. The bevel gear is driven sequentially by the segmental gear section 28 in accordance with the normal operation of the knotter, such operation being adequate to cause the shaft 42 to rotate one complete revolution each time it is to function in conjunction with the operation of clamp means 36.

The outer terminal end of shaft 42 is provided with suitable anti-friction means such as a ball 48. Said anti-friction means is engaged by an extension 50 on one end of lever 52 which is pivotally supported by pivot pin 22. The opposite end 54 is connected by shock-absorbing means 56 to a cam-follower lever 58 having a rotatable roller 60 on the outer end thereof which directly engages the periphery of the rotatable cam 26 for actuation thereby. The opposite end of lever 58 is pivotally connected by another pivot pin 62 to a suitably shaped portion on lever 52. By means of such arrangement, it readily can be seen that movement originating with cam 26 is imparted through extension 50 of lever 52 to the shaft 42 for longitudinal movement thereof for purposes to be described hereinafter.

Clamp means 36 primarily comprises a stationary clamp member 64 and a movable clamp member 66, both of which are mounted on a smooth cylindrical section 47 of shaft 42 between splined portion 43 and the end which carries ball 48. The movable clamp member 66 is secured by suitable connecting means to shaft 42 adjacent the outer end thereof for both rotation and longitudinal movement therewith relative to stationary clamp member 64. The outer surface 68 of stationary clamp member 64 is complementary to and preferably abuts the outer face of projecting boss 38. Clamp member 64 is maintained against rotation by means of a suitable locking pin 70 which extends into a complementary recess formed in the outer face of boss 38. Clamp member 64 also is provided with an axial bore 72 which rotatably receives shaft 42 with relatively close tolerance and also permits longitudinal movement of the shaft relative to clamp member 64.

Figure 3:
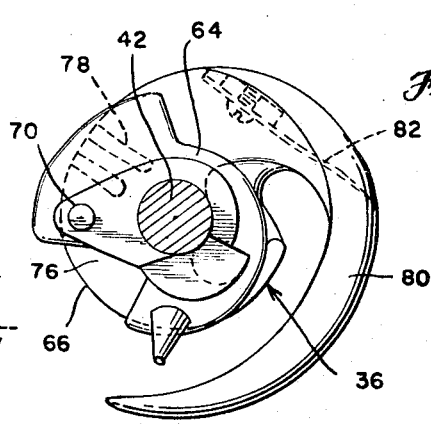
FIG. 3 is a transverse sectional view of the mechanism shown in FIG. 2 as seen on the line 3—3 of said figure.

The adjacent, coengaging clamping surfaces 74 and 76 of clamp members 64 and 66 are complementary and, in the preferred construction of the invention, are conical. Appropriate grooves 78, see FIG. 3, are formed in the surface 76 of clamp member 66. Also fixed to movable clamp member 66 is a somewhat spirally arranged, tapered hook 80 which is moved with clamp member 66 incident to the cooperative functioning of knotter unit 14 in order to form a completed knot in each strand of twine which is placed around bales, as they are formed by the baler, so as to tie the same into completed, compressed condition. Further details of the function of hook 80 are not believed to be essential for a complete understanding of the operation of the present invention but if further details are desired, attention is directed to said aforementioned prior art patents.

The primary purpose of the cooperating clamp members 64 and 66 is to secure between the clamping surfaces 74 and 76 thereof the outer end of a strand of twine, not illustrated, to effectively hold the same while the strand of twine is being disposed in encircling manner around a bale being formed in the baler. This continues until a bale of suitable size is formed, as determined by conventional controlling mechanism on the baler, whereupon the arcuate needle, referred to above but not illustrated in the drawing, functions to complete the encircling of a strand of twine around the bale, the operation of said needle being in conjunction with the functioning of the knotter unit 14 and with which the clamp means 36 also functions during such knotting operation, as follows.

When the aforementioned arcuate needle moves an elongated loop of twine into the vicinity of clamp means 36, the knotter unit 14 is brought into operation by the functioning of the segmental gear section 28. Said gear section also actuates bevel gear 46 of the clamp means 36 for purposes of revolving the hook 80 into engagement with said elongated loop of twine for purposes of facilitating the functioning of the knotter unit 14 in a manner described fully in said aforementioned patents. At the completion of the forming of a knot between the leading end of a strand of said twine and the adjacent portion of said elongated loop thereof to which said leading end is tied in accordance with the foregoing procedure, the trailing portion of said elongated loop is severed from the tied strand of twine by a knife 82 fixedly carried by hook 80 and at least the basic principles of operation of which are described and shown in said aforementioned patents.

To prepare the mechanism to release the tied and knotted strands of twine which has just been formed around a bale, it is necessary to release the leading end thereof from between the clamping surfaces 74 and 76 of clamp members 64 and 66. This occurs immediately prior to the trailing portion of said elongated loop of twine being severed by knife 82. Such release is effected by an arcuate relief portion 84, see FIG. 1, in cam 26 which, when brought into opposition to follower-roller 60, causes extension 50 of arm 52 to be moved a slight distance away from ball 48 and the outer end of shaft 42, thus relaxing the otherwise constantly maintained pressure of clamping surface 76 against clamping surface 74.

Such relaxing extends for only a very short portion of a second of time, particularly since the entire knotting operation normally requires less than one full second. Severing of the strand of twine occurs during such very brief portion of time and is completed before the newly severed end of the twine can escape from between the clamping surfaces 74 and 76. Clamping pressure then is restored when the relief portion 84 of cam 26 moves beyond follower-roll 60, whereby the newly cut end of the continuous length of twine is effectively clamped by the clamp means 36 and the cycle of operation described hereinabove is repeated.

In the operation of twine clamping means employed in balers at present which function in the manner described hereinabove, it has been found that, especially due to the rotation of clamping surface 76 with respect to clamping surface 74 while strands of twine extend between said surfaces incident to the aforementioned knots being tied tied in the baling operations, and further considering the fact that conventional twine comprises a twisted strand of a great number of small fibers of vegetable material such as hemp and the like, particles and shreds of such fibers become enmeshed between the clamping surfaces and ultimately are worked upwardly between the bore 72 and the cylindrical portion 47 of shaft 42 which is rotatable therein.

If such accumulation continues to such an extent that various types of malfunctioning of the clamp means ensues. Current practice requires at least partial disassembly of the mechanism to free it of such accumulation. Therefore, it is the principal purpose of the present invention to eliminate such malfunctioning and avoid such disassembly by providing a discharging opening 86 in the portion of stationary clamp member 64 which is directly below the surface 68 thereof which abuts against boss portion 38 of casting 24. The opening 86 preferably extends radially outward from the bore 72 in clamp member 64 and the opening preferably subtends a limited, minor portion of the circumference of bore 72 whereby, especially from FIG. 2, it will be seen that an adequate axial portion of the circumference of shaft 42 is exposed at the innermost portion of the opening 86 to permit the desired expelling of unwanted shreds and fibers therethrough.

The opening 86, in accordance with the preferred construction thereof in accordance with the invention also is defined at the opposite sides thereof by faces 88 and 90 which preferably flare outwardly with respect to each other. Also, the extent of the opening 86 in an axial direction preferably is about half the total axial dimension of stationary clamp member 64 since it has been found that this extent of the opening is adequate to effect highly desirable results relative to automatic elimination of stray particles and shreds of twine fibers which migrate upwardly between the bore 72 and the shaft 42.

To further facilitate the removal of any such undesirable particles and shreds of twine fibers and the like from between the bore 72 and shaft 42, the face 88 defining the leading side of opening 86, considered with regard to the direction of rotation of shaft 42, as indicated by the arrow extending partially around the same in FIGS. 2 and 3, is disposed so as to define an acute angle with respect to the adjacent wall portion of bore 72 and thus provide a knife-like edge 92 which is in close, sliding proximity with respect to the cylindrical surface of shaft 42 within bore 72 when the movable clamp member 66 is rotated with respect to stationary clamp member 64. As shown in FIG. 3, the surface of face 88 is generally tangential relative to the periphery of portion 47 of shaft 42.

Accordingly, the edge 92 provides a shearing action relative to shaft 42 which is adequate to effectively engage any particles or shreds of twine fibers within the very limited space between bore 72 and shaft 42 as the same appears in the discharging opening 86 and thus scrapes or unwinds the same with respect to shaft 42. The tangential position of face 88 produces a surface which deflects or cams the threads and twine fibers radially outwardly as these fibers are directed against it responsive to rotation of shaft 42. This results in a highly effective discharge of such extraneous fibrous material from clamp means 36. This insures continuous and highly satisfactory operation of the clamping means 36 in a manner improved over corresponding clamp means in knotters of balers presently in use and especially those of the type illustrated in said aforementioned patents.

While the invention has been described and illustrated in its preferred embodiment, it should be understood that the invention is not to be limited to the precise details herein illustrated and described since the same may be carried out in other ways falling within the scope of the invention as claimed.

What is claimed is:

1. Twine clamp means for a knotter unit of a baler employing twine to tie bales in completed form, said twine clamp means comprising a pair of clamping members having complementary substantially conical clamping surfaces, one of said clamping members being provided with a bore extending axially thereof, means to support said one clamping member stationarily relative to said knotter unit, a shaft connected at one end substantially axially to said other clamping member and extending through said bore of said one clamping member for rotation and axial movement therein and means connected to said shaft and operable to move the same as aforesaid, said one clamping member having a discharging opening communicating with and extending substantially radially outward from said bore to permit automatic expelling of particles of twine therethrough and thereby prevent accumulation thereof upon said shaft or within said bore.

2. The twine clamp means according to claim 1 in which said discharging opening extends from said bore to the radial outer surface of said one clamping member.

3. The twine clamp means according to claim 1 in which one wall of said discharging opening extends substantially axially of said bore and at an acute angle to the adjacent surface of said shaft substantially to define a knife-like edge engageable with any particles of twine fibers upon said shaft and operable to remove the same therefrom.

4. The twine clamp means according to claim 3 wherein said one wall is generally tangential to said shaft and the portion of said shaft within said one clamping member has a smooth cylindrical periphery from which said knife-like edge removes fibers.

5. The twine clamp means according to claim 1 in which said discharge opening subtends a limited minor portion of the circumference of said bore and the axially extending walls of said opening are flared outwardly away from each other to provide ample access to discharging particles of twine.

6. The twine clamp means according to claim 5 in which the leading wall of said opening relative to the direction of rotation of said shaft in said bore extends at an acute angle to the adjacent wall of said bore substantially to define a knife-like edge engageable with any particles of twine fibers upon said shaft and operable to remove the same therefrom and facilitate discharge of such particles from said bore and shaft.

7. The twine clamp means according to claim 5 in which said knife-like edge extends substantially parallel to the axis of said bore.

References Cited

UNITED STATES PATENTS

| | | | |
|---|---|---|---|
| 1,155,860 | 10/1915 | Witte | 289—13 |
| 1,529,914 | 3/1925 | Prochazka | 289—13 |
| 2,716,035 | 8/1955 | Thorndike | 289—13 |

OTHER REFERENCES

LOUIS K. RIMRODT, *Primary Examiner.*